United States Patent
Shrimali et al.

(10) Patent No.: US 11,748,529 B2
(45) Date of Patent: Sep. 5, 2023

(54) SYSTEMS AND METHODS FOR GENERATING AN EXTENSIBLE DIGITAL FORMULATION NETWORK MODEL AND IMPLEMENTING AN INTELLIGENT FORMULATION USING THE FORMULATION NETWORK MODEL

(71) Applicant: Turing Labs, Inc., New York, NY (US)

(72) Inventors: Manmit Shrimali, Oakville (CA); Ajith Govind, Bengaluru (IN); Michael L. Thompson, Cincinnati, OH (US)

(73) Assignee: Turing Labs, Inc., New York, NY (US)

( * ) Notice: Subject to any disclaimer, the term of this patent is extended or adjusted under 35 U.S.C. 154(b) by 0 days.

(21) Appl. No.: 17/978,960

(22) Filed: Nov. 1, 2022

(65) Prior Publication Data
US 2023/0161928 A1     May 25, 2023

Related U.S. Application Data

(60) Provisional application No. 63/297,410, filed on Jan. 7, 2022, provisional application No. 63/253,492, filed on Oct. 7, 2021.

(51) Int. Cl.
*G06F 30/18*     (2020.01)
*H04L 67/12*     (2022.01)
(Continued)

(52) U.S. Cl.
CPC .............. *G06F 30/18* (2020.01); *G06F 30/12* (2020.01); *G06F 2111/00* (2020.01); *G06F 2119/22* (2020.01); *H04L 67/12* (2013.01)

(58) Field of Classification Search
CPC ...... G06F 30/18; G06F 30/12; G06F 2111/00; G06F 2119/22; H04L 67/12
See application file for complete search history.

(56) References Cited

U.S. PATENT DOCUMENTS 5,644,686 A * 7/1997 Hekmatpour ............ G09B 7/04
706/53
2009/0070177 A1 * 3/2009 Agarwal ................ G06Q 30/02
705/7.12

(Continued)

*Primary Examiner* — Kibrom K Gebresilassie
(74) *Attorney, Agent, or Firm* — Padowithz Alce; Alce PLLC

(57) ABSTRACT

A method and system for an accelerated design of a virtual product formulation based on an expert-enhanced quantitative formulation network includes sourcing qualitative expert formulation; creating a qualitative formulation network; extracting qualitative network-expansion data based on a category associated with a target product associated with the qualitative formulation network, creating a second set of network components including formulation variable nodes and formulation edge connections; integrating the second set of network components into the qualitative formulation network; transforming the qualitative formulation network integrated with the second set of network components to a quantitative formulation network; designing at least part of a virtual product formulation based on the quantitative formulation network; and generating a target formulation proposal that likely satisfies the target formulation objective based on executing the virtual product formulation as initialized.

17 Claims, 4 Drawing Sheets

(51) Int. Cl.
*G06F 119/22* (2020.01)
*G06F 111/00* (2020.01)
*G06F 30/12* (2020.01)

(56) References Cited

U.S. PATENT DOCUMENTS

2011/0029514 A1* 2/2011 Kerschberg ......... G06F 16/3326
  707/732
2018/0302290 A1* 10/2018 Rahman .................. H04L 41/22

* cited by examiner

200

Sourcing A Corpus of Formulation Data S210

Creating a Formulation Network Model S220

Quantifying Expert Formulation Data S230

Tuning a Quantitative Formulation Network S240

Iteratively Evolving a Quantitative Formulation Network S250

FIGURE 2

SYSTEMS AND METHODS FOR GENERATING AN EXTENSIBLE DIGITAL FORMULATION NETWORK MODEL AND IMPLEMENTING AN INTELLIGENT FORMULATION USING THE FORMULATION NETWORK MODEL

CROSS-REFERENCE TO RELATED APPLICATIONS

This application claims the benefit of US Provisional Application No. 63/253,492, filed Oct. 7, 2021, and US Provisional Application No. 63/297,410, filed Jan. 7, 2022, which are incorporated herein in their entireties by this reference.

TECHNICAL FIELD

This invention relates generally to the product formulation technology field, and more specifically to a new and useful formulation network model in the product formulation technology field.

BACKGROUND

Modern product formulation may be complex and obfuscated, which may create several challenges in product formulation and product experimentation. In particular, institutional knowledge of formulation data for a given product is often distributed in some known and unknown spaces. Additionally, formulation knowledge of expert formulators may not be memorialized in a manner that can be easily transferable into new product formulations.

Accordingly, the disconnect in sources of institutional formulation knowledge creates formulation data gaps, formulation data anomalies, and formulation data conflicts that reduce efficiencies, accuracies, and the quality of product formulations without a single source of truth for formulation data.

Thus, there is a need in the product formulation technology to create improved systems and methods for generating an integrated formulation network model that provides a comprehensive reference structure and advanced formulation tool.

The embodiments of the present application described herein provide technical solutions that address, at least the need described above.

BRIEF SUMMARY OF THE INVENTION(S)

In one embodiment, a computer-implemented method for an accelerated design of a virtual product formulation based on an expert-enhanced quantitative formulation network includes sourcing, via a web-accessible interface, qualitative expert formulation data from one or more expert formulators interfacing with a remote formulation service; at the remote formulation service that is implemented by a network of distributing computing systems: creating a qualitative formulation network based on deriving from the qualitative expert formulation data a first set of network components including a plurality of distinct formulation variable nodes representing distinct formulation variables, a plurality of formulation edge connections representing distinct contributory relationships between formulation variables, and a plurality of formulation parameter constraints that bound possible values for each of the distinct formulation nodes, wherein creating the qualitative formulation network includes: mapping in an n-dimensional space the plurality of distinct formulation variable nodes in a relation to a target formulation objective, and setting a distinct one of the plurality of formulation edge connections between distinct pairs of the plurality of distinct formulation variable nodes based on identifying a contributory relationship between two formulation variable nodes defining each of the distinct pairs; extracting, from a formulation service-generated corpus of formulation data, qualitative network-expansion data based on a category associated with a target product associated with the qualitative formulation network, wherein the qualitative network-expansion data, when meshed into the qualitative formulation network, increases one or more of available formulation variables and available formulation edge connections within the qualitative formulation network; creating, based on the qualitative network-expansion data, a second set of network components including one or more formulation variable nodes and one or more formulation edge connections; integrating the second set of network components into the qualitative formulation network for expanding the qualitative formulation network; transforming the qualitative formulation network integrated with the second set of network components to a quantitative formulation network by: (i) converting a distinct qualitative value associated with each of the plurality of distinct formulation variable nodes of the qualitative formulation network to a distinct quantitative node value; (ii) converting a distinct qualitative value associated with each of the plurality of formulation edge connections of the qualitative formulation network to a distinct quantitative edge value; designing at least part of a virtual product formulation based on the quantitative formulation network, wherein designing the virtual product formulation includes: extracting a subset of the distinct formulation variables associated with the plurality of distinct formulation variable nodes of the quantitative formulation network based on the distinct quantitative edge value associated with each of one or more of the formulation edge connections that connect to the subset of the distinct formulation variables, and setting one or more formulation variables of the virtual product formulation using the subset of the distinct formulation variables associated with the plurality of distinct formulation variable nodes of the quantitative formulation network; and generating a target formulation proposal that likely satisfies the target formulation objective based on executing the virtual product formulation as initialized.

In one embodiment, a computer-implemented method includes sourcing, via a web-accessible interface, qualitative expert formulation data from one or more expert formulators associated with a subscriber to a remote formulation service; creating a qualitative formulation network based on deriving from the qualitative expert formulation data a first set of network components including a plurality of distinct formulation variable nodes representing distinct formulation variables and a plurality of formulation edge connections representing distinct contributory relationships between formulation variables, wherein creating the qualitative formulation network includes: mapping the plurality of distinct formulation variable nodes around a target formulation objective, and setting a distinct one of the plurality of formulation edge connections between distinct pairs of the plurality of distinct formulation variable nodes based on identifying a contributory relationship between two formulation variable nodes defining each of the distinct pairs; extracting, from a formulation service-generated corpus of formulation data, qualitative network-expansion data based on a category associated with a target product associated with the qualitative formulation network; creating, based on the qualitative network-expansion data, a second set of network components including one or more formulation variable nodes and one or more formulation edge connections; integrating the second set of network components into the qualitative formulation network for expanding the qualitative formulation network; transforming the qualitative formulation network integrated with the second set of network components to a quantitative formulation network by: (i) converting a distinct qualitative value associated with each of the plurality of distinct formulation variable nodes of the qualitative formulation network to a distinct quantitative node value; (ii) converting a distinct qualitative value associated with each of the plurality of formulation edge connections of the qualitative formulation network to a distinct quantitative edge value; initializing at least part of a virtual product formulation based on the quantitative formulation network, wherein initializing the virtual product formulation includes: extracting a subset of the distinct formulation variables associated with the plurality of distinct formulation variable nodes of the quantitative formulation network based on the distinct quantitative edge value associated with each of one or more of the formulation edge connections that connect to the subset of the distinct formulation variables, and setting one or more formulation variables of the virtual product formulation using the subset of the distinct formulation variables associated with the plurality of distinct formulation variable nodes of the quantitative formulation network; and generating a target formulation proposal that likely satisfies the target formulation objective based on executing the virtual product formulation as initialized.

In one embodiment, computing one or more probability distributions based on the distinct qualitative value associated with each of the plurality of distinct formulation variable nodes and of the distinct qualitative value associated with each of the plurality of formulation edge connections of the qualitative formulation network, wherein converting the distinct qualitative value associated with each of the plurality of distinct formulation variable nodes and of the distinct qualitative value associated with each of the plurality of formulation edge connections of the qualitative formulation network is based on the computed one or more probability distributions.

In one embodiment, the computed one or more probability distributions identify probabilities that a given formulation variable or a given combination of formulation variables affect the target formulation objective, wherein the converting includes assigning the distinct quantitative node value to a target formulation variable node of the quantitative formulation network based on identifying a probability value along a distinct one of the one or more probability distributions that aligns with a given distinct qualitative value associated with the target formulation variable node.

In one embodiment, transforming the qualitative formulation network to the quantitative formulation network includes: replacing each distinct qualitative value associated with each of the plurality of distinct formulation variable nodes of the qualitative formulation network with the distinct quantitative node value associated with each of the plurality of formulation variable nodes; and replacing each distinct qualitative value associated with each of the plurality of formulation edge connections of the qualitative formulation network with the distinct quantitative edge value associated with each of the plurality of formulation edge connections.

In one embodiment, extracting the subset of the distinct formulation variables includes: defining an extraction query based on the category associated with the target product; querying the quantitative formulation network based on the extraction query; and returning the subset of the distinct formulation variables based on querying the quantitative formulation network using the extraction query.

In one embodiment, the virtual product formulation is partially configured with a plurality of subscriber-defined formulation variables; and the initializing the at least part of the virtual product formulation includes augmenting the plurality of subscriber-defined formulation variables with the subset of the distinct formulation variables extracted from the quantitative formulation network.

In one embodiment, if the virtual product formulation is not configured with any subscriber-defined formulation variables, the initializing the at least part of the virtual product formulation includes configuring the virtual product formulation with service-generated formulation variables comprising the subset of the distinct formulation variables extracted from the quantitative formulation network.

In one embodiment, the target formulation proposal includes a proposed composition of formulation variables of the plurality of distinct formulation variables and an associated quantitative value for each of the formulation variables of the proposed composition.

In one embodiment, the method further includes generating, via a display of the web-accessible GUI, a graphical representation of the quantitative formulation network that includes displaying a representation of each of the plurality of distinct formulation variable nodes and each of the plurality of formulation edge connections of the quantitative formulation network in relation to the target formulation objective.

In one embodiment, the display comprising the graphical representation of the quantitative formulation network includes one or more graphical objects that, when manipulated by the subscriber, reveals from the quantitative formulation network one or more of the plurality of distinct formulation variable nodes that contribute to a satisfaction of the target formulation object beyond a set or a minimum contribution amount.

In one embodiment, extracting, from the formulation service-generated corpus of formulation data, the qualitative network-expansion data includes: identifying historical formulation data that is categorically similar to the target product associated with the qualitative formulation network; and enhancing a probative value of the qualitative formulation network by integrating the historical formulation data into the qualitative expert formulation network.

In one embodiment, a computer-program product includes computer-executable instructions for sourcing, via a web-accessible graphical user interface (GUI), qualitative expert formulation data from one or more expert formulators associated with a subscriber to a remote formulation service; creating a qualitative formulation network based on deriving from the qualitative expert formulation data a first set of network components including a plurality of distinct formulation variable nodes representing distinct formulation variables and a plurality of formulation edge connections representing distinct contributory relationships between formulation variables, wherein creating the qualitative formulation network includes: mapping the plurality of distinct formulation variable nodes in relation to a target formulation objective, and setting a distinct one of the plurality of formulation edge connections between distinct pairs of the plurality of distinct formulation variable nodes based on identifying a contributory relationship between two formulation variable nodes defining each of the distinct pairs;

extracting, from a formulation service-generated corpus of formulation data, qualitative network-expansion data based on a category associated with a target product associated with the qualitative formulation network; creating, based on the qualitative network-expansion data, a second set of network components including one or more additional formulation variable nodes and one or more additional formulation edge connections; integrating the second set of network components into the qualitative formulation network that expands the qualitative formulation network; transforming the qualitative formulation network integrated with the second set of network components to a quantitative formulation network by: (i) converting a distinct qualitative value associated with each of the plurality of distinct formulation variable nodes of the qualitative formulation network to a distinct quantitative node value; (ii) converting a distinct qualitative value associated with each of the plurality of formulation edge connections of the qualitative formulation network to a distinct quantitative edge value; initializing at least part of a virtual product formulation based on the quantitative formulation network, wherein initializing the virtual product formulation includes: extracting a subset of the distinct formulation variables associated with the plurality of distinct formulation variable nodes of the quantitative formulation network based on the distinct quantitative edge value associated with each of one or more of the formulation edge connections that connect to the subset of the distinct formulation variables, and setting one or more formulation variables of the virtual product formulation using the subset of the distinct formulation variables associated with the plurality of distinct formulation variable nodes of the quantitative formulation network; and generating a target formulation proposal that likely satisfies the target formulation objective based on executing the virtual product formulation as initialized.

In one embodiment, computing one or more probability distributions based on the distinct qualitative value associated with each of the plurality of distinct formulation variable nodes and of the distinct qualitative value associated with each of the plurality of formulation edge connections of the qualitative formulation network, wherein converting the distinct qualitative value associated with each of the plurality of distinct formulation variable nodes and of the distinct qualitative value associated with each of the plurality of formulation edge connections of the qualitative formulation network is based on the computed one or more probability distributions.

In one embodiment, the computed one or more probability distributions identify probabilities that a given formulation variable or a given combination of formulation variables affect the target formulation objective, wherein the converting includes assigning the distinct quantitative node value to a target formulation variable node of the quantitative formulation network based on identifying a probability value along a distinct one of the one or more probability distributions that aligns with a given distinct qualitative value associated with the target formulation variable node.

In one embodiment, transforming the qualitative formulation network to the quantitative formulation network includes: replacing each distinct qualitative value associated with each of the plurality of distinct formulation variable nodes of the qualitative formulation network with the distinct quantitative node value associated with each of the plurality of formulation variable nodes; and replacing each distinct qualitative value associated with each of the plurality of formulation edge connections of the qualitative formulation network with the distinct quantitative edge value associated with each of the plurality of formulation edge connections.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Intelligent Product Formulation System

Figure 1:
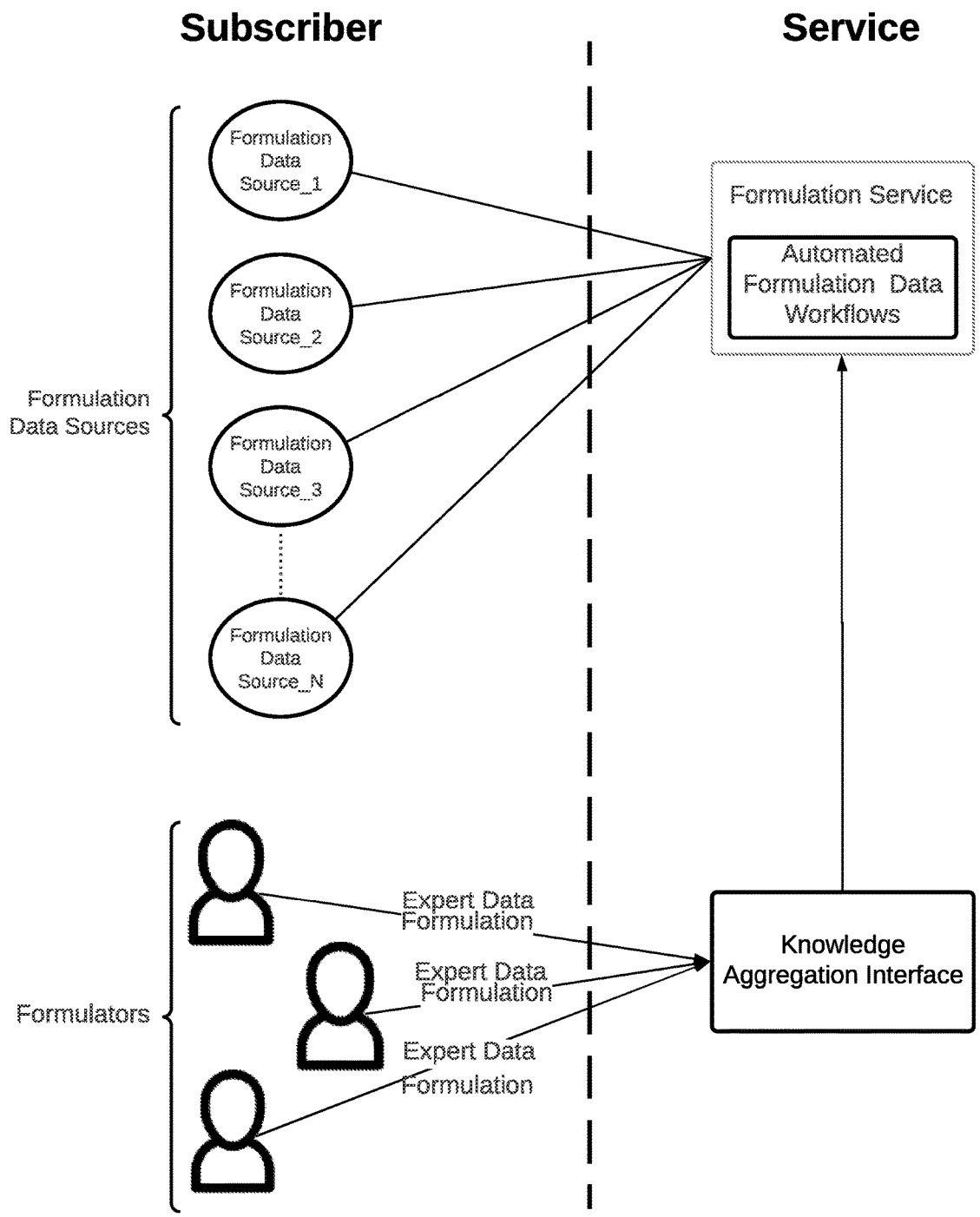
FIG. 1 illustrates a schematic representation of a system 100 in accordance with one or more embodiments of the present application.

As shown in FIG. 1, a system 100 for intelligent product formulations and/or experimentations include a remote formulation service no and expert formulation graphical user interface 120.

Figure 3:
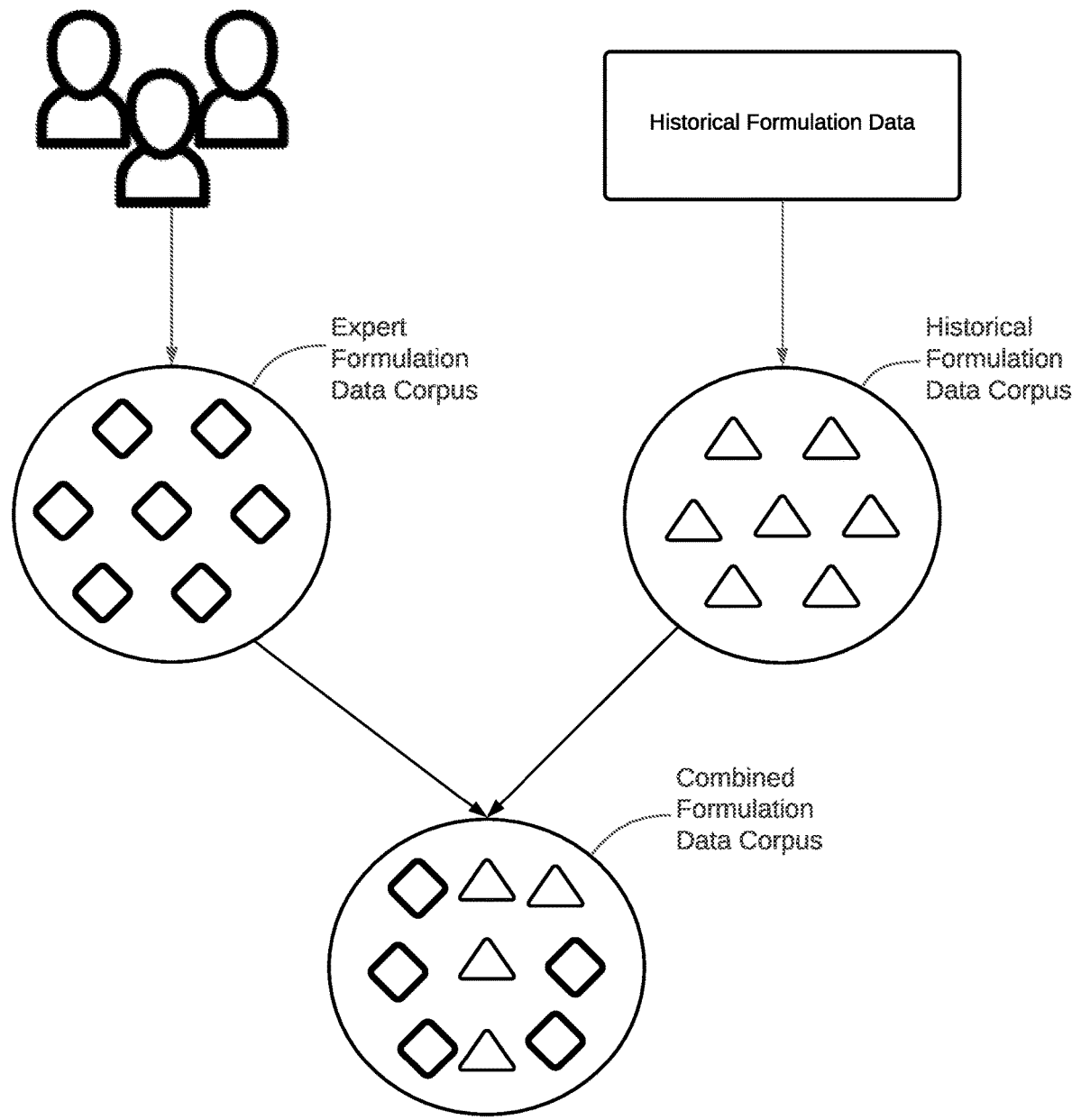
FIG. 3 illustrates an example schematic of expert formulator data integration in accordance with one or more embodiments of the present application.

The remote formulation service no, which may be referred to herein as the "formulation service", may have an integrated communication connection with a plurality of distinct sources of formulation data and/or product data of a target product. The remote formulation service no preferably enables an integration of formulator expertise data together with existing product formulation data and a generation of a visualization of the formulator expertise integrated structure, as shown by way of example in FIG. 3.

In one or more embodiments, the remote formulation service no includes a plurality of distinct formulation modules that provide enhanced formulation capabilities for intelligently generation one or more formulations of a target product. In such embodiments, the remote formulation service 110 includes an insight explorer module, a lab bench module, and a workspace module. In one embodiment, the insight explorer module may enable formulators and/or subscribers to the formulation service to explore, evaluate, and/or manipulate one or more intelligent formulation tools, such as a quantitative formulation network (e.g., Digital Brain). In one embodiment, the lab bench module may provide one or more formulation tools including, but not limited to, a formulation simulation tool and a formulation optimization tool. In one embodiment, the workspace module may provide a virtual formulation workspace for creating product formulations, executing formulations, and/or storing formulation result data.

The expert formulation graphical user interface 120, which may be sometimes referred to herein as the "expert interface", may be in operable control communication with the remote formulation service 110. In one or more embodiments, the expert interface 120 may include a formulation application programming interface (API) that may be programmatically integrated with one or more APIs of the remote formulation service 110 and one or more APIs of one or more sources of formulation data and/or product data.

Additionally, or alternatively, the system 100 may include a machine learning subsystem (not shown) that may be intelligently configured to assist in automatically generating or setting formulation parameters and/or actively implement simulations and/or optimizations (e.g., for formulation experiments, etc.) of one or more formulations.

Additionally, or alternatively, the machine learning subsystem may implement one or more ensembles of trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), (generative) adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

2. Method for Generating an Extensible Formulation Network Model

As shown by reference to FIG. 2, a method 200 for generating an extensible quantitative formulation network model includes sourcing a plurality of corpora of formulation data S210, evaluating expert formulation data and creating a qualitative formulation network S220, quantifying expert formulation data S230, and tuning a quantitative formulation network S240. The method 200 optionally includes iteratively evolving a quantitative formulation network S250.

2.10 Sourcing Formulation Intelligence Data

S210, which includes sourcing a plurality corpora of formulation data, may function to collect and/or obtain distinct corpora of formulation data for a target product from one or more distinct sources of formulation data. Preferably, S210 when being implemented by a remote formulation service may function to interface, via a graphical user interface (GUI) or application programming interface, with a subscriber to the remote service implementing the method 200 and/or the system 100 for identifying and collecting the formulation data for the target product of the subscriber. In a preferred embodiment, at least one corpus of formulation data may be sourced via collecting historical or past formulation data derived from one or more formulation attempts (if any) for a target product.

Existing Formulation Data Upload

In one or more embodiments, S210 may function to source a corpus of historical formulation data from one or more distinct sources of historical formulation data of a subscribing user to one or more data repositories of the remote formulation service. In such embodiments, S210 may function to operably connect via a network and/or programmatically integrate a formulation service or system implementing the method 200 to the one or more distinct formulation data sources for a target product. One or more points of integration or connection, preferably, enable a discovery of and access to sources of historical formulation data and may further establish one or more channels through which selective portions of historical formulation data may be uploaded for evaluation and processing.

In one or more embodiments, the historical formulation data preferably includes quantitative data describing one or more formulation findings or results, formulation criteria and/or experimentation criteria for creating and/or revising a target product. The historical formulation data may additionally include results and/or outcomes of various experimentations performed for a product formulation discovery.

Additionally, or alternatively, when sourcing historical formulation data, S210 may function to direct and/or store each distinct type of historical formulation data to a distinct corpus (with the formulation service). In this way, S210 may function to delineate each distinct type of historical formulation data for downstream processing including, but not limited to, one or more component contributions, one or more experimental conditions, and/or component relationship processing. It shall be recognized that, while each distinct type of historical formulation data may be stored in a distinct corpus, together the plurality of distinct corpora of historical formulation data may define a global corpus of historical formulation data.

Expert Formulation Data Corpus|Expert Initiation

Additionally, or alternatively, S210 may function to source a corpus of expert-based formulation data from one or more distinct formulation experts. In a preferred embodiment, S210 may function to implement one or more automated formulation data workflows that, when executed, automatically interfaces with one or more formulation experts for systematically collecting expert formulation data via expertise prompts, expertise queries, data aggregation portals, formulation inquiries, and/or the like. Expert formulation data, as referred to herein preferably relates to a collection of human expert know-how and/or human expert aptitude in product criteria and product formulation criteria that is not generally known or available from other sources of product formulation sources. Accordingly, an expert formulator, as referred to herein, preferably relates to a system or human-expert having experience in formulating a category or type of target product for more than a threshold period of time (i.e., a minimum number of years of formulation experience or minimum number of formulation experiments performed as determined by industry professionals, policy, or guidance).

In one or more embodiments, when sourcing expert formulation data, S210 may function to implement a knowledge aggregation interface or portal (e.g., a web-accessible graphical user interface being operably controlled by a remote formulation service) that may be accessed or presented to a target expert for collection expert formulation data. Via the knowledge aggregation interface, S210 may function to execute one or more automated formulation data workflows that may operate to collect data for a plurality of formulation and product criteria or domains (e.g., topics) such as, but not limited to, expected product outcomes (e.g., variables), key product components (e.g., ingredients), formulation space conditions (e.g., lab conditions) that influence product outcomes, relationships between product components, constraints between relationships between product components, key relationships between product components and formulation space conditions, constraints between relationships between relationships between product components and formulation space conditions, synergistic relationships between product components, synergies between product components and formulation space conditions. In such embodiments, S210 may additionally or alternatively function to store responses and/or data collected for a given domain or topic in a distinct corpus.

Additionally, or alternatively, S210 may function to automatically perform a mapping between expert response data based on formulation expertise queries and a potential graphical node or a potential graphical edge of a likely qualitative formulation network. In one or more embodiments, each expertise prompt or expertise query presented via the web-accessible interface may be digital associated with an entry of a mapping data structure, such that a response to a distinct expertise prompt or expertise query may be routed to or input into a specific entry location within the mapping data structure (e.g., reference table or the like). Accordingly, in such embodiments, S210 may function to create a nodes and edges mapping, which may be in the form of a reference table or any suitable data structure, that aligns each answer of a formulation expert to a creation of a graphical node or a graphical edge in a qualitative formulation network. The nodes and edges mapping may be used as an input in a generation of the qualitative formulation network, as described in more detail herein.

Additionally, or alternatively, in some embodiments, the one or more automated formulation data workflows that may be executed for collecting formulation and product criteria data may be informed and/or derived based on an identification of a product type or product category for which formulation experiments may be desired.

Sourcing External & Miscellaneous Product Intelligence Data

Additionally, or alternatively, S210 may function to source external formulation and product intelligence data beyond formulation and/or product intelligence associated with a subscriber. In one or more embodiments, external formulation and product intelligence data may include data sourced from and/or via interactions with third parties (e.g., component or ingredient supplier intelligence) that support a product commercialization of a target product. Additionally, or alternatively, formulation and product intelligence data may include data sourced from users of a target product. Accordingly, external formulation and product intelligence data may be sourced from any external activity, pre-product formulation activity, and post-product formulation activity (e.g., commercialization activities including, but not limited to, product packaging activities, product processing activities, product delivery activities, and the associated trial and error data derived and/or obtained via observations of these activities.

2.20 Feature Correlation Discovery|Formulation Network Creation

S220, which includes evaluating the expert formulation data and creating a formulation network, may function to derive formulation intelligence data from the expert formulation data and automatically generate a qualitative formulation network.

Evaluation|Deriving Formulation Intelligence Data

In one or more embodiments, an evaluation of a corpus of expert formulation data includes deriving a corpus of formulation intelligence data. Formulation intelligence data, as referred to herein, preferably relate to a collection of computed inferences that may identify one or more formulation *nexus* between two or more formulation criteria and/or between one or more formulation criteria and a formulation outcome. For instance, an evaluation of the corpus of expert formulation data may function to identify relationships between distinct pairs of product components (e.g., product ingredients, product variables, product conditions, and/or the like), prioritize the distinct pairings based on relationship strength, and identify or expose the product component relationships that rank highest.

In one or more embodiments, an evaluation of the corpus of expert formulation data may include an assessment of a nodes and edges mapping data structure that may inform a creation of one or more graphical nodes and one or more connector edges within the qualitative formulation network. In one implementation, S220 may function to set or create a distinct graphical node within the qualitative formulation network for each expert response or entry within the mapping data structure that identifies a formulation variable or component, such as an ingredient or formulation condition. In this one implementation, S220 may function to set or create a distinct graphical edge between distinct pairs of graphical nodes within the qualitative formulation network for each expert response or entry within the mapping data structure that identifies a contributory relationship between formulation variables or components to a target formulation outcome or objective. A contributory relationship, as referred to herein, preferably relates to a connection or a relationship between two formulation variables that have a likely influence (i.e., increase or decrease) or effect on a value of a formulation outcome or formulation objective.

Accordingly, an evaluation of the corpus of expert formulation data may include a discovery and surfacing of relationships between formulation features and/or formulation criteria.

In one implementation, S220 may function to individually assess each formulation criteria and/or product criteria to identify one or more formulation or product criteria with the highest contribution probability to one or more formulation objectives or product formulation outcomes. That is, in this implementation, S220 may function to simulate a contribution of a single formulation criteria or product criteria towards a formulation objective for a target product. Accordingly, S220 may function to prioritize and/or rank each formulation criteria and/or product criteria based on their respective contribution probability. Additionally, or alternatively, S220 may function to identify a set of formulation or product criteria having the highest contribution probability or a contribution probability satisfying a contribution threshold (e.g., a minimum contribution value) as top drivers or highest probability contributors toward formulation objectives.

In an additional or alternative implementation, an evaluation of the corpus of expert formulation data may include identifying informative relationships and/or synergistic relationships between formulation criteria and/or product criteria. In one or more embodiments, S220 may function define a plurality of distinct pairwise between formulation criteria and/or product criteria that may be assessed to identify one or more pairwise of formulation criteria having an informative relationship and/or a synergistic relationship toward a formulation outcome for a target product. In one embodiment, S220 may function to simulate a variation of values of the criteria of a distinct pairwise to determine whether the distinct criteria of the target pairwise have an influence or a contribution (e.g., satisfying or exceeding a contribution threshold) towards a formulation objective for a target product.

Generating a Qualitative Formulation Network

In one or more embodiments, S220 may function to generate a qualitative formulation network based on expert formulation data and/or formulation intelligence data derived from the expert formulation data. In a preferred embodiment, the qualitative formulation network includes a network graph that includes graphical nodes and graphical edges that connect distinct pairs of graphical nodes within the network graph. In such preferred embodiment, within the network graph, the graphical nodes may represent product and/or formulation variables and the graphical edges may represent a relationship between pairs of graphical nodes.

In one or more embodiments, a size of a graphical node within the qualitative formulation network may indicate a relative importance or contribution of a product or formulation variable towards a formulation outcome or formulation objective. As a non-limiting example, the greater a size of a graphical node, the increased or greater the importance of the product variable or formulation variable in a formulation of a product having a desired attribute (i.e., formulation outcome). Similarly, in such embodiments, a length of, thickness of, value attributed to, or the like a graphical edge between distinct pairs of graphical nodes may indicate a contributory relationship strength between each distinct pair of graphical nodes. In one example, the shorter a length of a graphical edge between graphical nodes, the greater a relationship between the product variables represented by the graphical nodes. In this example, an extent of the graphical edges between graphical nodes (e.g., formulation and/or product criteria) and a size or an extent of a graphical node may be based on the formulation intelligence data derived based on the expert formulation data.

Prior Beliefs Integration

Additionally, or alternatively, S220 may function to integrate and/or augment the qualitative formulation network with one or more corpora of formulation prior data or predetermined formulation data. Formulation prior data, as referred to herein, preferably relate to a collection of product-informed formulation learnings derived from a plurality of historical formulations, product experiments, and/or formulation/product exploratory content (e.g., external literature, etc.). Preferably, S210 may function to select a set or corpus of formulation priors based on identifying a set of formulation prior data having a same or similar category as a target product of an intended formulation.

In one or more embodiments, S220 may function to identify a formulation category, such as a product category, associated with the qualitative formulation network and extract a subset of formulation data from the corpus of service-generated formulation data based on the formulation category data. That is, in such embodiments, S220 may function to perform a search of the corpus of service-generated formulation data using a query that includes or that may be informed by the formulation category or a semantically similar formulation category. The result of the performed search may include a subset formulation data of the corpus of service-generated formulation data, such as formulation variables, formulation relationships, formulation conditions, formulation processes, and/or the like, which S220 preferably converts to formulation variable nodes and/or formulation edges for augmenting the qualitative network. In a preferred embodiment, S220 may evaluate the formulation variable nodes and/or formulation edges of the service-generated formulation data against the formulation variable nodes and formulation edges of the qualitative network and exclude from the set of nodes and edges of the service-generated formulation data any nodes and/or edges that are redundant and/or are overlapping with existing nodes and edges of the qualitative formulation network. Consequently, S220 may function to propose a set of nodes and edges derived from the service-generated formulation data that are non-overlapping with the nodes and edges of the qualitative formulation network.

Accordingly, in a first implementation, S220 may augment a first set of formulation variable nodes and formulation edges derived from expert formulation data with a second set of formulation variable nodes and formulation edges derived from predetermined formulation data curated by a formulation service or formulation system (e.g., system 100) implementing the method 200. In this first implementation, S220 may function to integrate the second set of formulation variable nodes and formulation edges of the service-generated formulation data into the existing qualitative formulation network. As such, an augmentation of the second set of formulation variable nodes and the formulation edges may enable and/or improve a robustness of the qualitative network by filling in unrealized or missing formulation components (variables) and formulation edges (relationships) that may inform one or more target outcomes of a formulation experiment or the like.

In a second implementation, S220 may function to modify an extent of one or more of the formulation variable nodes and/or one or more of the formulation edges of the qualitative formulation network based on formulation intelligence or insights extracted from or derived from the service-generated formulation data. In such embodiments, S220 may function to use the formulation intelligence to modify an extent of nodes and/or edges of the qualitative formulation network by adjusting the qualitative values associated with the one or more nodes and/or the one or more edges of the qualitative formulation network. In a non-limiting example, a qualitative value of a formulation variable node may be increased from a first qualitative value (e.g., low contribution) to a second qualitative value (e.g., medium contribution) based on formulation intelligence derived from the service-generated formulation data indicating a that the target formulation variable node has a greater contribution towards a formulation outcome than indicated by expert formulator data. Similarly, S220 may perform the converse and decrease a value of a formulation variable node or edge based on the formulation intelligence. Correspondingly, S220 may function to adapt a virtual representation of each formulation variable node and/or each formulation edge that is adapted based on the formulation intelligence derived from the service-generated formulation data to increase or decrease a given node's size (i.e., increased contribution or decreased contribution) and/or to modify an extent of a formulation edge (e.g., shorten or lengthen, thicken or thin out, etc.).

2.30 Quantitative Conversion of Qualitative Formulation Network

Figure 4:
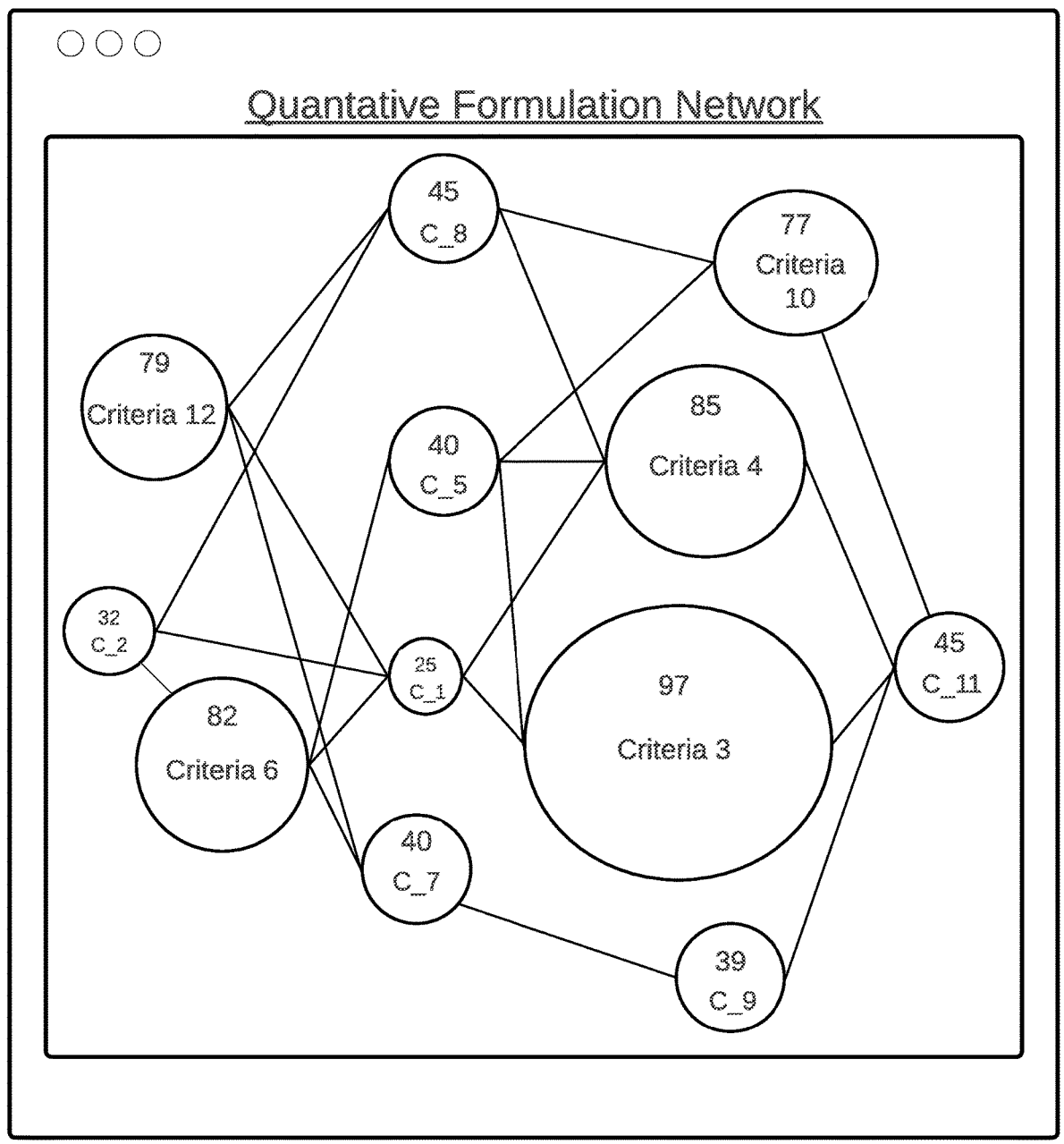
FIG. 4 illustrates an example schematic of a quantitative formulation network in accordance with one or more embodiments of the present application.

S230, which includes quantifying expert formulation data, may function to convert a qualitative formulation network to a quantitative formulation network, as shown by way of example in FIG. 4. In one or more embodiments, data represented within the qualitative formulation network may include data that may not have a cognate numerical representation but rather may include relative representations of expert understandings of formulation and/or product criteria. Accordingly, to increase the utility of a formulation network in computing new and/or enhanced formulation criteria and/or formulations, S230 may function to transform qualitative data within the formulation network to include corresponding quantitative values.

In one or more embodiments, converting a qualitative formulation network to a quantitative formulation network includes computing probability distributions based on formulation variable data and outcome data derived from attributes of the qualitative formulation network. In such embodiments, S230 may function to compute probability distributions that identify probabilities that a given formulation variable or formulation component and/or a given combination of formulation variables or components contribute to or affect a target formulation outcome. Accordingly, S220 may function to compute a probability distribution for each distinct formulation variable or each distinct formulation variable combination, represented within the qualitative formulation network, associated with a qualitative contribution towards a recognized outcome within the qualitative network. It shall be recognized that a formulation component may include, but is not limited to, an ingredient for a product or composition of matter, a process or technique of creating or formulating a product or composition, and/or any process or technique implemented in a development and/or deployment (e.g., commercialization) of a product or composition.

Additionally, or alternatively, a quantitative conversion of the qualitative formulation network may include quantifying a contribution of each formulation variable or component of the qualitative formulation network to one or more target outcomes. That is, S230 may function to convert qualitative data indicative of a formulation variable's or formulation component's contribution to a target outcome to a quantified value. In one or more embodiments, S230 may function to identify a range of qualitative data values within a qualitative dataset of a formulation variable or component. For example, qualitative ratings (by formulation experts or the like) for a strength of contribution of a formulation variable to a formulation outcome may include none, weak, moderate, and strong. In such an example, a qualitative range for the qualitative dataset of a strength of contribution of the formulation variable to a target formulation outcome may be none-to-strong (e.g., satisfying or exceeding a set contribution-to-outcome (value) threshold).

In response to identifying a qualitative range for a target formulation variable, S230 may function to compute a frequency for each qualitative bin (e.g., weak, moderate, strong, etc.) of the range. In some embodiments, S220 may function to quantify each qualitative bin of the qualitative range and/or derive statistical metrics and the like for each bin based on the frequency/count data associated with the target formulation variable. For instance, S220 may function to compute a probability of an event, such as a contribution of a formulation variable to a formulation outcome, based on identifying a quotient of the frequency or count of a distinct (e.g., moderate) qualitative outcome over a total number of qualitative outcomes for a given formulation variable.

Accordingly, S230 may function to evaluate and derive quantitative metric values for contribution-to-outcome for each target formulation variable of the qualitative formulation network based on the computed formulation variable-to-formulation outcome probability distributions. In one or more embodiments, once quantitative values may be computed for each qualitative value of the qualitative formulation network, S230 may function to convert the qualitative formulation network to the quantitative formulation network by augmenting or annotating each associated graphical node and/or graphical edge with a corresponding quantitative value. In some embodiments, S230 may function to convert the qualitative formulation network to the quantitative formulation network by replacing each qualitative value of formulation variable contribution with a corresponding quantitative metric value.

In one or more embodiments, a conversion of the qualitative formulation network to a quantitative formulation network enables a quantified identification of a number of drivers of formulation performance and formulation outcomes including an identification formulation variables/components and/or product criteria that are top drivers of one or more product formulation outcomes, an identification of one or more strength of relationship values between graphically connected pairs of nodes (i.e., formulation and/or product criteria), and a revelation of a formulation and product knowledge network.

2.40 Formulation Network Tuning|Expert Augmentation

S240, which includes tuning a quantitative formulation network, may function to evaluate the quantitative network graph and intelligently adjust and/or tune one or more quantitative values and/or parameters of the quantitative formulation network based on the evaluation. In or more embodiments, tuning the quantitative formulation network may additionally include computing and injecting new quantitative values into one or more components of the quantitative formulation network.

Gap Analysis-Based Tuning

In one or more embodiments, S240 may function to perform a gap analysis of the one or more sections or portions of a quantitative formulation network. In such embodiments, the gap analysis may include identifying one or more regions of the quantitative formulation network that may be missing a quantitative value for a graphical node (e.g., a formulation and/or product criteria) and/or that may be missing a quantitative value for a graphical edge or connector (e.g., a strength of relation, a synergistic value, or the like).

In such embodiments, S240 may function to tune the quantitative formulation network based on the gap analysis. In one or more embodiments, tuning the quantitative formulation network includes sourcing one or more quantitative value estimates, quantitative confidence values, or quantitative probabilities from one or more expert formulators of a target product. In such embodiments, S240 may function to present, via formulation user interface or portal, the quantitative formulation network and/or the one or more gaps in formulation network data to the one or more expert formulas with one or more gap-specific prompts for collecting the formulation network data required to address the gap. Accordingly, S240 may function to tune and/or update the quantitative formulation network based on a response corpus created from expert formulator responses to the one or more gap-specific prompts.

Additionally, or alternatively, tuning the quantitative formulation network may include identifying biased formulation network data and eliminating or mitigating the identified bias from the quantitative formulation network. Additionally, or alternatively, S240 may function to identify one or more conflicts in formulation network data within the quantitative formulation network and determine one or more resolutions to the identified conflicts. In such embodiments, S240 may identify resolutions to conflicts by interfacing with one or more expert formulators for quantitative insights that may support a resolution of the conflict in formulation network data.

Additionally, or alternatively, S240 may include a confirmation and/or validation stage for either confirming or validating a state of the structure of the quantitative formulation network. In one or more embodiments, validating the quantitative formulation network includes obtaining a consensus on the one or more regions of the structure, the graphical representations, and/or the quantitative values associated with the graphical representation of the quantitative formulation network.

2.50 Iteratively Evolving the Quantitative Formulation Network

Optionally, or additionally, S250 includes iteratively evolving a quantitative formulation network model, may function to periodically calibrate or re-calibrate one or more graphical nodes and/or graphical edge connectors of the quantitative formulation network based on new product formulation and/or experimentation data.

In one or more embodiments, when new formulation and/or product data may be created and/or acquired by a formulation service or system implementing the method 200, S250 may function to implement an iterative update loop or feedback loop (e.g., executing S220-S240) that infuses the new formulation data, product data, and/or formulation intelligence derived from the new formulation data into the quantitative formulation network.

In some embodiments, post-formulation activity data including, but not limited to, subscriber-associated activities and external activity data (e.g., real-world data) may be harvested and utilized to derive new formulation and/or product intelligence data. In such embodiments, S250 may function to initialize a feedback loop or iteration mechanism that ingests the new formulation and/or product intelligence data for extending the quantitative formulation network model by adding or removing (graphical) network nodes and/or edges, by modifying the strength of connections (graphical edges) between pairs of network nodes, elaborating relationships via graphical annotations, and/or similar tailoring of the formulation network model.

Simulation and Optimization

Additionally, or alternatively, the method 200 or related method may function to implement the quantitative formulation network in any suitable manner for initializing and/or enabling one or more operations of an automatic formulation and/or a semi-automatic formulation or formulation refresh of a target product. In a preferred embodiment, the quantitative formulation network may interface and/or be integrated with a plurality of distinct formulation modules. In a non-limiting example, the method 200 may function to enable a programmatic interface or the like between one or more of a formulation simulation module and an optimization module of a system 100 or the like. In such an example, the formulation simulation module may communicate a simulation objective to the quantitative formulation network and the formulation network may function to return simulation parameters for implementing or for executing a computer-implemented formulation simulations for a target product. Similarly, an optimization module may function to communicate parameters to be optimized for a target formulation and in response, the quantitative formulation network may function to return optimization parameters or the like for creating an objective function for initializing an optimization.

In one embodiment, S250 may function to implement the quantitative formulation network for initializing new product formulation experiments having limited or no product formulation parameters (e.g., a cold start formulation). In such embodiments, a reference or a search query to the quantitative formulation network model may function to identify or extract formulation parameters (and associated parameters values), formulation constraints, and/or the like that may be used in one or more automated formulation workflows including, but not limited to an adaptive design of a formulation experiment (semi- or fully) automated workflows for creating a target new product. In one or more embodiments, the search query submitted to the quantitative formulation network may include a product category or features of the target of the product formulation. In a non-limiting example, S250 may function to construct a search query (e.g., network search query) based on the product category or product feature data and use the search query to identify or discover formulation variables and/or formulation parameters having a semantic similarity to the product category or product features associated intended cold start formulation. In this way, in some embodiments, at least part of a target formulation or formulation experiment may be automatically configured using the formulation variables and/or formulation parameters values (e.g., formulation variable values and the like). That is, the formulation variables and/or formulation parameter values of a target formulation may be set by a formulation service implementing the system and/or methods described herein based on the network search query.

Additionally, or alternatively, S250 may function to implement the quantitative formulation network for informing and/or setting a training and/or use of one or more machine learning models assistive in a formulation of a target product. In a non-limited example, a reference and/or a search query to the quantitative formulation network model may function to curate or return a training data corpus for training a generative adversarial network or the like that may be used to formulate or generate new ingredients or ingredient combinations for a target product.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for an accelerated design of a virtual product formulation based on an expert data-enhanced quantitative formulation network, the computer-implemented method comprising:
   sourcing, via a web-accessible interface, qualitative expert formulation data from one or more expert formulators interfacing with a remote formulation service;
   at the remote formulation service that is implemented by a network of distributed computing systems:
      creating a qualitative formulation network based on deriving from the qualitative expert formulation data a first set of network components including a plurality of distinct formulation variable nodes representing distinct formulation variables, a plurality of formulation edge connections representing distinct contributory relationships between the distinct formulation variable nodes, and a plurality of formulation parameter constraints that bound possible values for each of the distinct formulation variable nodes, wherein creating the qualitative formulation network includes:
         mapping in an n-dimensional space the plurality of distinct formulation variable nodes in a relation to a target formulation objective, and
         setting a distinct one of the plurality of formulation edge connections between distinct pairs of the plurality of distinct formulation variable nodes based on identifying a contributory relationship between two formulation variable nodes defining each of the distinct pairs;
      extracting, from a formulation service-generated corpus of formulation data, qualitative network-expansion data based on a category associated with a target product associated with the qualitative formulation network, wherein the qualitative network-expansion data, when meshed into the qualitative formulation network, increases one or more of available formulation variables and available formulation edge connections within the qualitative formulation network;
      creating, based on the qualitative network-expansion data, a second set of network components including one or more formulation variable nodes and one or more formulation edge connections;
      integrating the second set of network components into the qualitative formulation network for expanding the qualitative formulation network;
      transforming the qualitative formulation network integrated with the second set of network components to a quantitative formulation network by:
         (i) converting a distinct qualitative value associated with each of the plurality of distinct formulation variable nodes of the qualitative formulation network to a distinct quantitative node value;
         (ii) converting a distinct qualitative value associated with each of the plurality of formulation edge connections of the qualitative formulation network to a distinct quantitative edge value;
      designing at least part of a virtual product formulation based on the quantitative formulation network, wherein designing the virtual product formulation includes:
         extracting a subset of the distinct formulation variables associated with the plurality of distinct formulation variable nodes of the quantitative formulation network based on the distinct quantitative edge value associated with each of one or more of the formulation edge connections that connect to the subset of the distinct formulation variables, and
         setting one or more formulation variables of the virtual product formulation using the subset of the distinct formulation variables associated with the plurality of distinct formulation variable nodes of the quantitative formulation network; and
      generating a target formulation proposal that likely satisfies the target formulation objective based on executing the virtual product formulation as designed.

2. A computer-implemented method comprising:
   sourcing, via a web-accessible interface, qualitative expert formulation data from one or more expert formulators associated with a subscriber to a remote formulation service;
   creating a qualitative formulation network based on deriving from the qualitative expert formulation data a first set of network components including a plurality of distinct formulation variable nodes representing distinct formulation variables and a plurality of formulation edge connections representing distinct contributory relationships between formulation variables, wherein creating the qualitative formulation network includes:
      mapping the plurality of distinct formulation variable nodes around a target formulation objective, and
      setting a distinct one of the plurality of formulation edge connections between distinct pairs of the plurality of distinct formulation variable nodes based on identifying a contributory relationship between two formulation variable nodes defining each of the distinct pairs;
   extracting, from a formulation service-generated corpus of formulation data, qualitative network-expansion data based on a category associated with a target product associated with the qualitative formulation network;
   creating, based on the qualitative network-expansion data, a second set of network components including one or more formulation variable nodes and one or more formulation edge connections;

integrating the second set of network components into the qualitative formulation network for expanding the qualitative formulation network;

transforming the qualitative formulation network integrated with the second set of network components to a quantitative formulation network by:

(i) converting a distinct qualitative value associated with each of the plurality of distinct formulation variable nodes of the qualitative formulation network to a distinct quantitative node value;

(ii) converting a distinct qualitative value associated with each of the plurality of formulation edge connections of the qualitative formulation network to a distinct quantitative edge value;

initializing at least part of a virtual product formulation based on the quantitative formulation network, wherein initializing the virtual product formulation includes:

extracting a subset of the distinct formulation variables from the plurality of distinct formulation variable nodes of the quantitative formulation network based on the distinct quantitative edge value associated with each of one or more of the formulation edge connections that connect to the subset of the distinct formulation variables, and setting one or more formulation variables of the virtual product formulation using the subset of the distinct formulation variables associated with the plurality of distinct formulation variable nodes of the quantitative formulation network; and generating a target formulation proposal that likely satisfies the target formulation objective based on executing the virtual product formulation as initialized.

3. The computer-implemented method according to claim 2 further comprising:

computing one or more probability distributions based on the distinct qualitative value associated with each of the plurality of distinct formulation variable nodes and of the distinct qualitative value associated with each of the plurality of formulation edge connections of the qualitative formulation network, wherein converting the distinct qualitative value associated with each of the plurality of distinct formulation variable nodes and of the distinct qualitative value associated with each of the plurality of formulation edge connections of the qualitative formulation network is based on the computed one or more probability distributions.

4. The computer-implemented method according to claim 3, wherein the computed one or more probability distributions identify probabilities that a given formulation variable or a given combination of formulation variables affect the target formulation objective, wherein the converting includes assigning the distinct quantitative node value to a target formulation variable node of the quantitative formulation network based on identifying a probability value along a distinct one of the one or more probability distributions that aligns with a given distinct qualitative value associated with the target formulation variable node.

5. The computer-implemented method according to claim 2, wherein transforming the qualitative formulation network to the quantitative formulation network includes:

replacing each distinct qualitative value associated with each of the plurality of distinct formulation variable nodes of the qualitative formulation network with the distinct quantitative node value associated with each of the plurality of formulation variable nodes; and replacing each distinct qualitative value associated with each of the plurality of formulation edge connections of the qualitative formulation network with the distinct quantitative edge value associated with each of the plurality of formulation edge connections.

6. The computer-implemented method according to claim 2, wherein extracting the subset of the distinct formulation variables includes:

defining an extraction query based on the category associated with the target product;

querying the quantitative formulation network based on the extraction query; and returning the subset of the distinct formulation variables based on querying the quantitative formulation network using the extraction query.

7. The computer-implemented method according to claim 2, wherein the virtual product formulation is partially configured with a plurality of subscriber-defined formulation variables; and the initializing the at least part of the virtual product formulation includes augmenting the plurality of subscriber-defined formulation variables with the subset of the distinct formulation variables extracted from the quantitative formulation network.

8. The computer-implemented method according to claim 2, wherein if the virtual product formulation is not configured with any subscriber-defined formulation variables, the initializing the at least part of the virtual product formulation includes configuring the virtual product formulation with service-generated formulation variables comprising the subset of the distinct formulation variables extracted from the quantitative formulation network.

9. The computer-implemented method according to claim 2, wherein the target formulation proposal includes a proposed composition of formulation variables of the plurality of distinct formulation variables and an associated quantitative value for each of the formulation variables of the proposed composition.

10. The computer-implemented method according to claim 2, further comprising:

generating, via a display of the web-accessible GUI, a graphical representation of the quantitative formulation network that includes displaying a representation of each of the plurality of distinct formulation variable nodes and each of the plurality of formulation edge connections of the quantitative formulation network in relation to the target formulation objective.

11. The computer-implemented method according to claim 10, wherein the display comprising the graphical representation of the quantitative formulation network includes one or more graphical objects that, when manipulated by the subscriber, reveals from the quantitative formulation network one or more of the plurality of distinct formulation variable nodes that contribute to a satisfaction of the target formulation object beyond a set or a minimum contribution amount.

12. The computer-implemented method according to claim 2, wherein
  extracting, from the formulation service-generated corpus of formulation data, the qualitative network-expansion data includes:
    identifying historical formulation data that is categorically similar to the target product associated with the qualitative formulation network; and
    enhancing a probative value of the qualitative formulation network by integrating the historical formulation data into the qualitative expert formulation network.

13. The computer-implemented method according to claim 2, wherein
  executing the virtual product formulation includes:
    implementing a plurality of computer simulations based on a design of the virtual product formulation, wherein within each of the plurality of computer simulations, iteratively setting new values for one or more of the distinct formulation variables of the target product formulation that optimize the target formulation objective.

14. A computer-program product comprising:
  sourcing qualitative expert formulation data from one or more expert formulators associated with a subscriber to a remote formulation service;
  creating a qualitative formulation network based on deriving from the qualitative expert formulation data a first set of network components including a plurality of distinct formulation variable nodes representing distinct formulation variables and a plurality of formulation edge connections representing distinct contributory relationships between formulation variables, wherein creating the qualitative formulation network includes:
    mapping the plurality of distinct formulation variable nodes in relation to a target formulation objective, and
    setting a distinct one of the plurality of formulation edge connections between distinct pairs of the plurality of distinct formulation variable nodes based on identifying a contributory relationship between two formulation variable nodes defining each of the distinct pairs;
  extracting, from a formulation service-generated corpus of formulation data, qualitative network-expansion data based on a category associated with a target product associated with the qualitative formulation network;
  creating, based on the qualitative network-expansion data, a second set of network components including one or more additional formulation variable nodes and one or more additional formulation edge connections;
  integrating the second set of network components into the qualitative formulation network that expands the qualitative formulation network;
  transforming the qualitative formulation network integrated with the second set of network components to a quantitative formulation network by:
    (i) converting a distinct qualitative value associated with each of the plurality of distinct formulation variable nodes of the qualitative formulation network to a distinct quantitative node value;
    (ii) converting a distinct qualitative value associated with each of the plurality of formulation edge connections of the qualitative formulation network to a distinct quantitative edge value;
  initializing at least part of a virtual product formulation based on the quantitative formulation network, wherein initializing the virtual product formulation includes:
    extracting a subset of the distinct formulation variables associated with the plurality of distinct formulation variable nodes of the quantitative formulation network based on the distinct quantitative edge value associated with each of one or more of the formulation edge connections that connect to the subset of the distinct formulation variables, and
    setting one or more formulation variables of the virtual product formulation using the subset of the distinct formulation variables associated with the plurality of distinct formulation variable nodes of the quantitative formulation network; and
  generating a target formulation proposal that likely satisfies the target formulation objective based on executing the virtual product formulation as initialized.

15. The computer-program product according to claim 14 further comprising:
  computing one or more probability distributions based on the distinct qualitative value associated with each of the plurality of distinct formulation variable nodes and of the distinct qualitative value associated with each of the plurality of formulation edge connections of the qualitative formulation network,
  wherein converting the distinct qualitative value associated with each of the plurality of distinct formulation variable nodes and of the distinct qualitative value associated with each of the plurality of formulation edge connections of the qualitative formulation network is based on the computed one or more probability distributions.

16. The computer-program product according to claim 15, wherein
  the computed one or more probability distributions identify probabilities that a given formulation variable or a given combination of formulation variables affect the target formulation objective,
  wherein the converting includes assigning the distinct quantitative node value to a target formulation variable node of the quantitative formulation network based on identifying a probability value along a distinct one of the one or more probability distributions that aligns with a given distinct qualitative value associated with the target formulation variable node.

17. The computer-program product according to claim 14, wherein transforming the qualitative formulation network to the quantitative formulation network includes:
  replacing each distinct qualitative value associated with each of the plurality of distinct formulation variable nodes of the qualitative formulation network with the distinct quantitative node value associated with each of the plurality of formulation variable nodes; and
  replacing each distinct qualitative value associated with each of the plurality of formulation edge connections of the qualitative formulation network with the distinct quantitative edge value associated with each of the plurality of formulation edge connections.

* * * * *